Aug. 19, 1952  R. S. ENABNIT  2,607,872
CONTROL FOR RADIO FREQUENCY HEATING OF RUBBER
Filed Nov. 13, 1948  2 SHEETS—SHEET 1

*INVENTOR.*
ROBERT S. ENABNIT
BY
*Attorney*

Patented Aug. 19, 1952

2,607,872

UNITED STATES PATENT OFFICE 2,607,872

CONTROL FOR RADIO FREQUENCY HEATING OF RUBBER

Robert S. Enabnit, Cuyahoga Falls, Ohio, assignor to Wingfoot Corporation, Akron, Ohio, a corporation of Delaware Application November 13, 1948, Serial No. 59,806

11 Claims. (Cl. 219—20)

This invention relates to apparatus for heating rubber and other like bodies with radio frequency current, and, more particularly, is concerned with apparatus of the indicated type for controlling the temperature of the body being heated.

It has been discovered that a conventional thermocouple cannot be used successfully during radio frequency heating of rubber and similar bodies for the reason that the introduction of the metal of the thermocouple causes the radio frequency field to be concentrated at the thermocouple and in the region of the material immediately surrounding the thermocouple to thereby give an incorrect temperature reading.

Moreover, in many cases, the field strength of the radio frequency current is sufficient to cause arcing from the high voltage electrode to the thermocouple with attendant carbonization of the rubber or other body.

Furthermore, it has been discovered that if the radio frequency current is shut off during a temperature measurement with a conventional thermocouple of the self-balancing type, that an appreciable time constant is required for balance in order to obtain a true indication of temperature, and this time constant is of sufficient duration to objectionably interrupt the radio frequency heating operation.

It is the general object of the present invention to avoid and overcome the foregoing and other difficulties of and objections to known and conventional practices, and this object is accomplished by the provision of improved, relatively inexpensive and readily operated apparatus of automatic but manually overrideable character for measuring radio frequency heated temperatures of rubber and similar bodies, and for automatically cutting off the radio frequency current when selected temperatures have been reached.

Another object of the invention is to provide temperature measuring thermocouples having a relatively short time constant.

Another object of the invention is the provision of apparatus of the type described in which a thermocouple is automatically and periodically injected into a rubber body or the like to measure its temperature, and with the radio frequency heating current being automatically shut off only during the time that the thermocouple is in the body.

The foregoing objects of the invention, and other objects which will become apparent as the description proceeds, are achieved by the provision of apparatus for controlling radio frequency heating of rubber and the like, the apparatus including a thermocouple, means for periodically introducing the thermocouple into the rubber, means for selectively varying the periodicity of operation of the thermocouple introducing means, means for shutting off the flow of radio frequency current to the rubber when the thermocouple is in the rubber and for turning the flow back on when the thermocouple is removed, photo-electric vacuum tube bridge means associated with the output of the thermocouple and providing a temperature reading of the rubber, and means for shutting off the flow of radio frequency when a selected temperature has been reached.

For a better understanding of the invention, reference should be had to the accompanying drawings, wherein.

Figure 1:
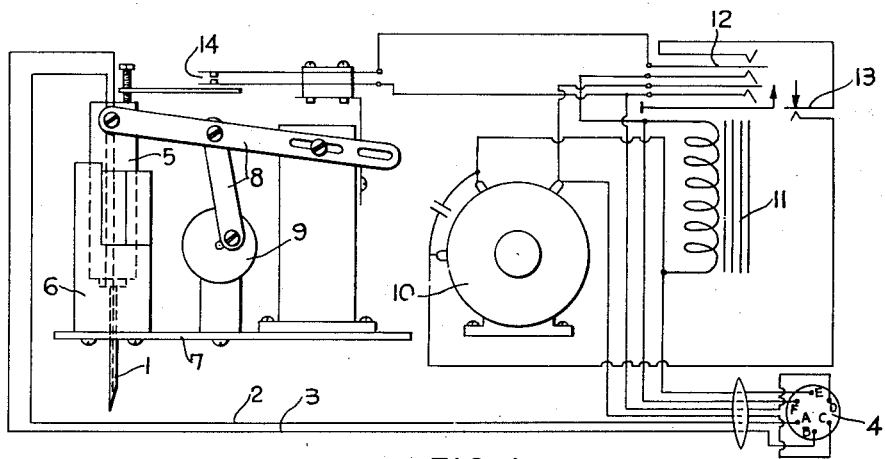
Fig. 1 is a diagrammatic side elevation of the thermocouple injecting apparatus incorporated in the invention.

Having more particular reference to the drawings, and to Fig. 1 thereof, the numeral 1 indicates a hypodermic needle having a thermocouple embedded in the end thereof, or formed as the tip thereof, and wires 2 and 3 extend from the thermocouple to a plug half 4. The hypodermic needle 1 is mounted in a plunger 5 slidably received in a casing 6 mounted on a base 7, the base being so positioned with respect to the rubber or other body to be heated that movement of the plunger 5 causes movement of the hypodermic needle 1 and the associated thermocouple into or out of the rubber body being heated.

In order to move the hypodermic needle 1 into and out of the rubber body being heated, linkage 8 is provided which is connected to a crank 9 operated by a synchronous motor 10 (for purposes of clarification the shaft connecting the the motor 10 to the crank 9 has not been illustrated). Associated with the motor 10 and the injecting mechanism just described is a latching relay 11 including the switches 12 operated thereby, an additional switch 13 also operated by the relay 11 as hereinafter described, and a switch 14 which is adapted to be closed when the plunger 5 reaches the top of its stroke.

It should be noted with respect to the apparatus heretofore described that the mass of the thermocouple junction is maintained as small as possible to reduce the heating period and heat loss from the rubber to the junction. Even when this is done, several seconds time may be required for the thermocouple to assume the temperature of the body into which it is injected and a delay of this extent is sometimes objectionable inasmuch as the time required to heat the rubber or other body may itself be quite short. The motor 10 is of the type which makes one revolution per second, and the time involved is always constant. The invention, accordingly, uses the one second time interval for completely injecting and removing the hypodermic needle 1 from the body being heated, and because of this short cycle, the indicating apparatus associated with the thermocouple and hereinafter described is appropriately calibrated with the approximately constant temperature lag included.

Figure 4:
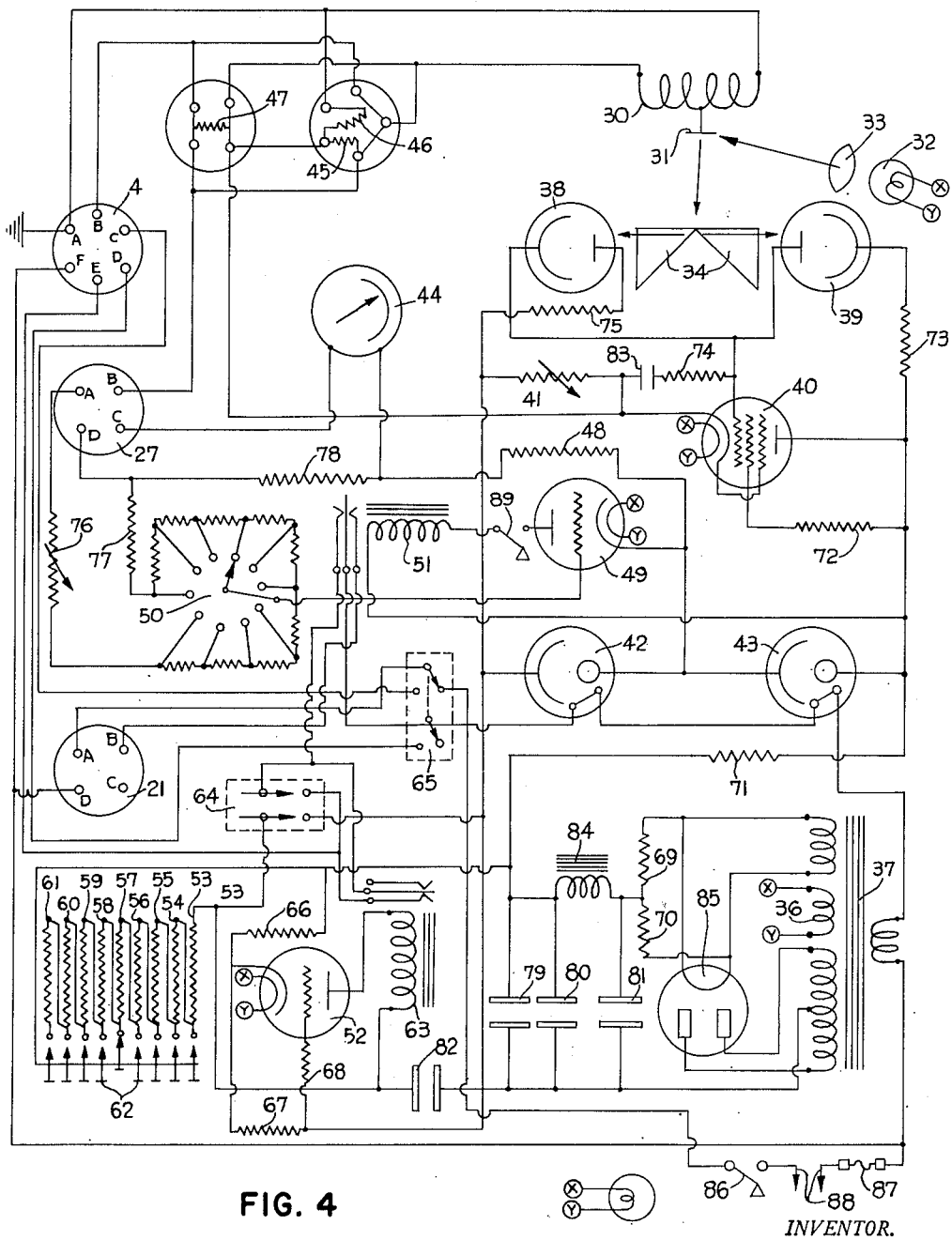
Fig. 4 is a schematic wiring diagram of the control mechanism of the invention.

The various parts of the mechanism described are connected to the plug half 4 in the manner illustrated in Fig. 1, the six prongs of this plug being identified by the letters A to F, and the plug half 4 is adapted to be connected to the mating plug half 4 as shown in Fig. 4, the six pins of which bear the letters A to F. It will be understood that one of the plug halves 4 is a male part, and the other is a female part so that when plugged together to provide the complete plug 4, electrical connections will be established between the apparatus of Figs. 1 and 4 in the manner illustrated.

Figure 2:
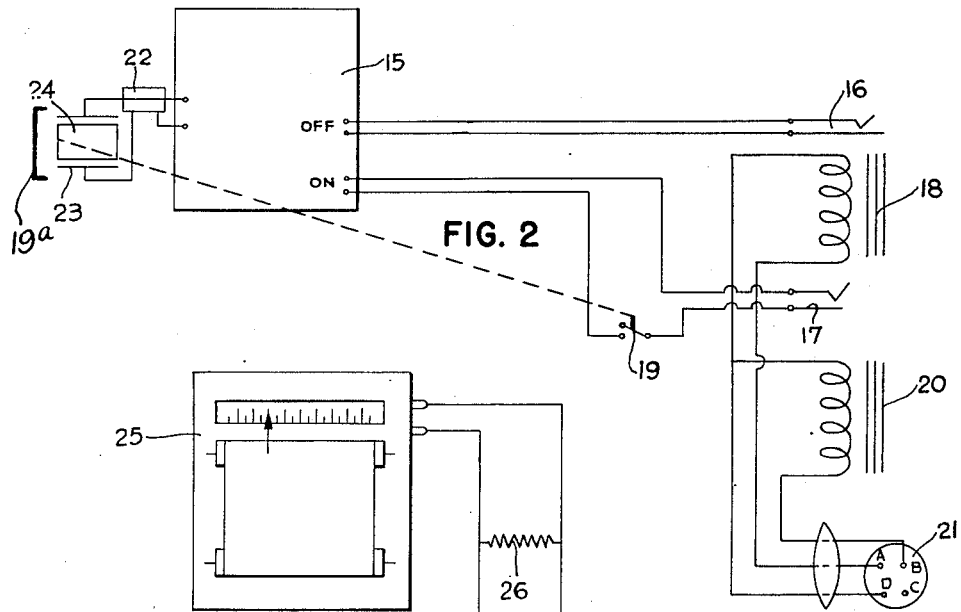
Fig. 2 is a schematic wiring diagram of the radio frequency generator and certain of the control apparatus of the invention.

Now having reference to Fig. 2 of the drawings, the numeral 15 indicates a radio frequency current generator associated with an off-switch 16 and an on-switch 17, switches being adapted to be operated respectively by relays 18 and 20 so that the generator 15 is normally operating until the relay 18 is energized to operate switch 16. A safety switch 19, operating as hereinafter described, is placed in series with the switch 17. The relays 18 and 20 are connected by a plug half 21 to the plug half 21 of the apparatus of Fig. 4. As above noted in conjunction with plug 4, and in accordance with conventional practice, the plug 21 is made up of two parts, one a male and the other a female. Fig. 2 also illustrates diagrammatically a feed line 22 for conducting the radio frequency current from the generator 15 to a condenser oven for heating a rubber or other body 24.

Figure 3:
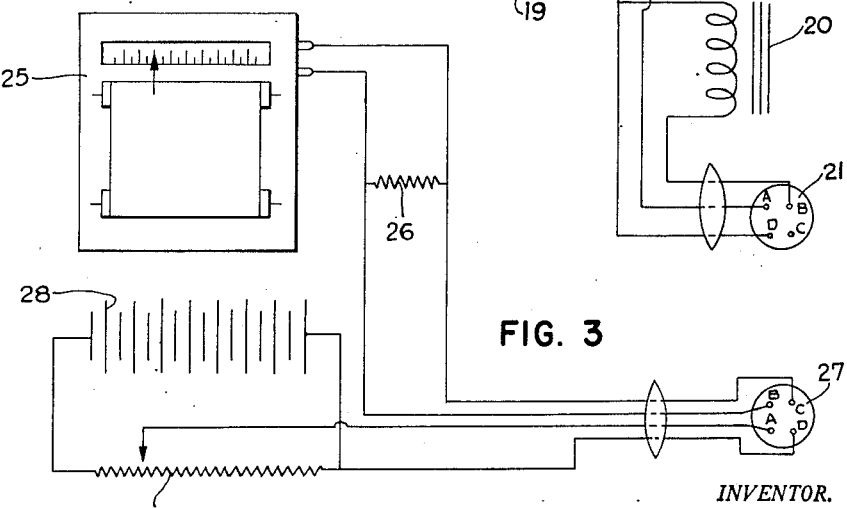
Fig. 3 is a schematic wiring diagram of indicating and control apparatus incorporated in the invention.

In Fig. 3 is illustrated a recording milliammeter 25 which is usually calibrated in terms of temperature, and having an appropriate shunt 26, the milliammeter being connected to a plug half 27, adapted to be connected to the counterpart plug half 27 shown in Fig. 4. Also connected to the plug half 27 in Fig. 3 is a battery 28 and a voltage divider 29 of approximately .5 megohms whose purpose will be hereinafter described.

Coming now to the apparatus as shown in Fig. 4, associated with the output of the thermocouple from Fig. 1 is an electronic bridge which is adapted to more rapidly determine and follow temperature variations to which the thermocouple is subjected than is a conventional galvanometer. Positioned between the electronic bridge and the thermocouple is a galvanometer 30 having a mirror 31 carried by the movable galvanometer coil, the mirror 31 reflecting a light beam thrown from a light source 32 through a condensing system 33 into a pair of oppositely positioned prisms 34. The light source 32 is connected to the leads marked X and Y of a filament transformer secondary 36 associated with the power supply transformer 37. All other tubes in the apparatus having filaments are likewise supplied by the X and Y leads from the filament transformer 36 in the manner diagrammatically illustrated in Fig. 4.

The prisms 34 direct the light beam reflected from the mirror 31 into gas photocell tubes 38 and 39, and dependent upon whether the tube 38 or the tube 39 gets the most of the light from the beam, a negative or a positive voltage is applied to the control grid of a pentode tube 40 (such as a type 38 tube) to thereby change the resistance of this tube.

The tube 40 comprises one leg of the electronic bridge circuit, the other legs comprising resistor 41 (25,000 ohms) and two voltage regulator tubes 42 and 43 (such as VR–75 tubes). A constant voltage is thus applied across the resistor and the tube 40. The balancing voltage is obtained from the center of the voltage regulators 42 and 43 to the junction of the tube 40 and resistor 41. When the tube resistance equals the resistance of resistor 41, then the voltage across the bridge is zero, because the branch currents are equal when the applied voltage is constant. It will be evident that the voltage regulators 42 and 43 assure a constant voltage both across the resistor 41-tube 40 combination and from either voltage regulator to the return circuit. Fluctuation of the resistance of tube 40 results in a change in current of one arm of the bridge which current flows through the return circuit inasmuch as the voltage across the balance points is no longer zero. By inserting a meter, such as a milliammeter 44, in the return circuit, the unbalanced current may be read. Thus, the electronic bridge circuit is in balance when the galvanometer mirror 31 reflects the beam from light 32 equally between the prisms 34. However, when the galvanometer 30 receives a flow of electric current from the thermocouple associated with the hypodermic needle 1 of Fig. 1, the mirror 31 is tilted to strike one of the prisms 34 more than the other with the result that a biasing voltage is applied to tube 40 to unbalance the bridge as heretofore described.

The galvanometer 30 is connected in the bridge return circuit through range resistors 45, 46 or 47 (the first two comprising standard range resistors for current measurement, and the last one comprising a standard range resistor for voltage measurement) so that movement of the galvanometer 30 to the right will result in a bridge current which tends to turn the galvanometer back to the left. The thermocouple connected to the galvanometer 30 through plug 4 provides the impulse to move the galvanometer to the right. Now, because any increase in current to the galvanometer is balanced by a current from the bridge, the total galvanometer deflection is extremely small and therefore of very short duration. The bridge current necessary to keep the galvanometer at zero is read directly upon the milliammeter 44, or is recorded by the milliammeter 25, and these instruments can be calibrated in terms of temperature.

Temperature control is obtained by applying the voltage produced across a resistor 48 in the bridge return circuit to the grid of a thyratron 49 (No. 884 type). A rotary selector switch 50 and associated 500 ohm resistor is used to obtain the proper bias voltage for any given bridge voltage desired to operate the thyratron 49. The firing of the thyratron 9 operates relay 51, which operating back through plug 21 operates relay 18 to shut off the radio frequency generator 15.

Cyclic timing mechanism to determine the total length that the radio frequency generator 15 is on before a temperature measurement is taken, comprises a second thyratron tube 52 (of the No. 884 type) which has various resistors 53 to 61 adapted to the time constant desired and selected by push buttons 62. The firing of the thyratron 52 energizes relay 63 to energize relay 18 and shut off the radio frequency generator 15.

The interlock of the apparatus, which comprises injecting the thermocouple in the rubber body to be tested for temperature only when the radio frequency generator 15 is off, works as follows: when relay 63 closes, latching relay 11 reverses itself, and this energizes injection motor 10 in a forward direction which plunges the thermocouple into the rubber body 24. The reversing of the relay 11 also breaks the plate current of the oscillator by closing relay 18 and keeping it closed. During the final portion of the movement of the plunger 5 away to draw the hypodermic needle 1 out of the rubber body, contacts 14 are mechanically closed sending another impulse to relay 11. This causes the relay 11 to operate to turn off the motor 10 and open relay 18 and also energizes relay 20 to turn the radio frequency generator 15 back on, thereby completing the cycle. In closing, the relay 11 momentarily strikes switch 13 reversing the polarity of the motor 10 thus serving as a brake to prevent over running of the injector. Contacts of relay 63 are in series with those of relay 51 so that relay 63 cannot operate when relay 51 is closed, and this prevents completion of the heating of the rubber body 24 when the thermocouple is injected therein. This is advisable so that the thermocouple is never in the rubber body when the body is ready to be removed.

To manually override the automatic means described, switch 64 can be pushed to immediately start a cycle of injection which causes the timer thyratron 52 to be reset to zero seconds regardless of its intermediate position. Also, by moving switch 65 downwardly and then pushing switch 64, the injector will extend into the rubber and remain there until switch 65 is reversed, whereupon the injector will be removed to complete the second half of the cycle. By manipulating switch 65 with switch 64 held in contact, the motor 10 may be stopped on any portion of the injection or withdrawal cycle.

An interlock is provided between switch 19 and a shield 19ª surrounding the rubber body 24 so that any possible premature opening of the shield breaks the switch 19 and removes the oscillator power.

The battery 28 and the voltage divider 29 are used to adjust the proper range of the rotary selector switch 50 in controlling the maximum cut-off temperature.

Apparatus incorporated in the assembly and not heretofore described includes a resistor 66 of 200 ohms, resistors 67 and 68 of .25 megohms, resistor 69 and 70 of 20 ohms, resistor 71 of 5000 ohms, resistor 72 of 2000 ohms, resistors 73, 74, and 75 of .1 megohm, resistor 76 of 25,000 ohms, resistor 77 of 40,000 ohms, and resistor 78 of .5 megohm. Also included are condensers 79, 80 and 81, each of 8 microfarads (electrolytic), condenser 82 of 8 microfarads, condenser 83 of .01 microfarad, an 8 millihenry choke 84, a type 80 rectifier tube 85, and on-off switch 86, a fuse 87, power input leads 88, and switch 89.

In the operation of the apparatus described, the apparatus for injecting the needle 1 and its associated thermocouple is mounted on the ground side electrode of the electrodes 23, a suitable hole being drilled through the electrode just large enough to accommodate the thermocouple needle. The plugs 4, 21, and 27 of the several figures of the drawing are connected together. Relays 18 and 20 are connected to the oscillator power relays, and switch 19 is installed on the shield 19ª surrounding the electrodes 23, and then the apparatus is plugged into the A. C. line by leads 88. The rotary selector switch 50 is set to the desired maximum temperature, and switch 89 is thrown to turn on thyratron tube 49. The time interval or cycle between temperature readings is selected by pushing the appropriate push button 62. The apparatus will then start to operate and no further attention need be given it. When the desired temperature has been reached in the rubber or other body 24, the radio frequency generator 15 will be automatically shut off and the body 24 can be removed and a new body to be vulcanized can be inserted between the load plates or electrodes 23. After each new load has been inserted between the electrodes 23, it is only necessary to throw the switch 64 temporarily to the right and then back to the left to start the radio frequency generator 15 and to reset the temperature control. If desired, the recording milliammeter 25 may be turned on or off at any time to record the progress of the heating. Other manual controls have heretofore been discussed.

It will be recognized that the various objects of the invention have been achieved by the provision of automatic temperature indicating and radio frequency heating control apparatus. Extensive tests of apparatus constructed in accordance with the invention have been made, and the temperatures obtained were found to be accurate, dependable and much faster than those obtained with any other apparatus. Control of the radio frequency generator in the manner described has been accomplished, as have over-all temperature automatic shut-offs, and variable cyclic times for the injection of the themocouple in the body being heated. In every case, the injection of the thermocouple automatically turns off the radio frequency generator, and the removal of the thermocouple turns the generator back on. The apparatus is relatively simple, light weight, and inexpensive, and occupies a relatively small space.

While certain representative embodiments and details have been shown for the purpose of illustrating the invention, it will be apparent to those skilled in this art that various changes and modifications may be made therein without departing from the spirit or scope of the invention.

What is claimed is:

1. Apparatus for controlling radio frequency heating of rubber and the like including a radio frequency current source, a thermocouple, a synchronous motor for periodically introducing the thermocouple into the rubber a fixed length of time, means actuated by the movement of the thermocouple for shutting off the flow of radio frequency current to the rubber when the thermocouple is in the rubber and for turning the flow back on when the thermocouple is removed, photo-electric vacuum tube bridge means associated with the output of the thermocouple and providing a temperature reading of the rubber, and means for shutting off the flow of radio frequency current when a selected temperature has been reached.

2. Apparatus for controlling radio frequency heating of rubber and the like including a radio frequency current source, a thermocouple, means for periodically introducing the thermocouple into the rubber, means for selectively varying the periodicity of operation of the thermocouple introducing means, means actuated by the movement of the thermocouple for shutting off the flow of radio frequency current to the rubber when the thermocouple is in the rubber and for turning the flow back on when the thermocouple is removed, photo-electric vacuum tube bridge means associated with the output of the thermocouple and providing a temperature reading of the rubber, and means for shutting off the flow of radio frequency current when a selected temperature has been reached.

3. Apparatus for controlling radio frequency heating of rubber and the like including a radio frequency current source, a thermocouple, a synthronous motor for periodically introducing the thermocouple into the rubber a fixed length of time, means for selectively varying the periodicity of operation of the thermocouple introducing motor, and means actuated by the movement of the thermocouple for shutting off the flow of radio frequency current to the rubber when the thermocouple is in the rubber and for turning the flow on when the thermocouple is removed.

4. Apparatus for controlling radio frequency heating of rubber and the like including a radio frequency current source, a thermocouple, means for periodically moving the thermocouple with a continuous motion into and out of the rubber over a fixed time cycle, means actuated by the movement of the thermocouple for shutting off the flow of radio frequency current to the rubber when the thermocouple is in the rubber and for turning the flow back on when the thermocouple is removed, means associated with the output of the thermocouple and providing a temperature reading of the rubber, and means for shutting off the flow of radio frequency current when a selected temperature has been reached.

5. Apparatus for controlling radio frequency heating of rubber and the like including a radio frequency current source, a thermocouple, synchronous motor means for periodically introducing the thermocouple into the rubber for a fixed time cycle, means actuated by the movement of the thermocouple for shutting off the flow of radio frequency current to the rubber when the thermocouple is in the rubber and for turning the flow back on when the thermocouple is removed, and photo-electric vacuum tube bridge means associated with the output of the thermocouple and providing a temperature reading of the rubber.

6. Apparatus for heating rubber and similar material by high frequency current comprising means for generating radio frequency current, electrode means connected to the generating means and between which the rubber is to be positioned, thermocouple means for measuring the temperature of the rubber, a periodically actuated motor for moving the thermocouple means with a continuous motion into and out of the rubber, means for automatically shutting off the generating means when the desired temperature has been reached, and switch means associated with the electrode means for automatically shutting off the generating means before the rubber can be removed from the electrode means.

7. Apparatus for heating rubber and similar material by high frequency current comprising means for generating radio frequency current, electrode means connected to the generating means and between which the rubber is to be positioned, thermocouple means for measuring the temperature of the rubber, adjustable frequency, constant cycle means for periodically moving the thermocouple means into and out of the rubber and means for automatically shutting off the generating means when the desired temperature has been reached.

8. Apparatus for heating rubber and similar material by high frequency current comprising means for generating radio frequency current, electrode means connected to the generating means and between which the rubber is to be positioned, means for periodically measuring the temperature of the rubber, and switch means controlled by said last-named means for automatically shutting off the generating means during the operation of the temperature measuring means and for automatically turning the generating means back on after the measurement.

9. Apparatus for heating rubber and similar material by high frequency current comprising means for generating radio frequency current, electrode means connected to the generating means and between which the rubber is to be positioned, means for periodically measuring the temperature of the rubber, means for selectively varying the periodicity of operation of the temperature measuring means, means for automatically shutting off the generating means when the desired temperature has been reached, and switch means controlled by the temperature measuring means for automatically shutting off the generating means during the operation of the temperature measuring means and for automatically turning the generating means back on after the measurement.

10. Apparatus for heating rubber and similar material by high frequency current comprising means for generating radio frequency current, electrode means connected to the generating means and between which the rubber is to be positioned, means for periodically measuring the temperature of the rubber, means for selectively varying the periodicity of operation of the temperature measuring means, and means controlled by the temperature measuring means for automatically shutting off the generating means during the operation of the temperature measuring means and for automatically turning the generating means back on after the measurement.

11. Apparatus for heating rubber and similar material by high frequency current comprising means for generating radio frequency current, electrode means connected to the generating means and between which the rubber is to be positioned, movable means having an operative and an inoperative position for periodically measuring the temperature of the rubber, manually controlled means for overriding and changing the action of the temperature measuring means to obtain a temperature measurement at any desired time, and switch means controlled by the temperature measuring means for automatically shutting off the generating means during the operation of the temperature measuring means and for automatically turning the generating means back on after the measurement.

ROBERT S. ENABNIT.

REFERENCES CITED

The following references are of record in the file of this patent:

UNITED STATES PATENTS

| Number | Name | Date |
|---|---|---|
| 1,981,631 | Northrup | Nov. 20, 1934 |
| 2,136,682 | Gilbert | Nov. 15, 1938 |
| 2,156,119 | Laub et al. | Apr. 25, 1939 |
| 2,386,966 | MacMillin | Oct. 16, 1945 |
| 2,421,098 | Vogt et al. | May 27, 1947 |
| 2,442,451 | Albin | June 1, 1948 |

OTHER REFERENCES

"Modern Plastics," June, 1944, pages 109–113.